United States Patent
Cederblad et al.

(10) Patent No.: US 6,391,420 B1
(45) Date of Patent: May 21, 2002

(54) BICOMPONENT ELASTOMERIC NETTING

(75) Inventors: Hans O. Cederblad, Minnetonka; Jan D. Seppala, St. Paul, both of MN (US)

(73) Assignee: Leucadia, Inc., New York, NY (US)

( * ) Notice: Subject to any disclaimer, the term of this patent is extended or adjusted under 35 U.S.C. 154(b) by 0 days.

(21) Appl. No.: 08/295,635

(22) PCT Filed: Feb. 28, 1992

(86) PCT No.: PCT/US92/01663

§ 371 Date: Aug. 26, 1994

§ 102(e) Date: Aug. 26, 1994

(87) PCT Pub. No.: WO93/16870

PCT Pub. Date: Sep. 2, 1993

(51) Int. Cl.[7] .............................. B32B 3/10; B32B 5/02; B32B 5/04

(52) U.S. Cl. ..................... 428/107; 428/131; 428/134; 428/167; 428/105; 442/1; 442/50; 442/328; 442/329

(58) Field of Search .................. 428/13.1, 134, 428/137, 105, 167, 107, 255, 231, 232, 229

(56) References Cited

U.S. PATENT DOCUMENTS

| | | | |
|---|---|---|---|
| 2,197,188 A | * 4/1940 | Lilley | ........................ 428/231 |
| 3,723,218 A | 3/1973 | Gaffney | |
| 4,107,371 A | 8/1978 | Dean | |
| 4,241,123 A | * 12/1980 | Shih | |
| 4,296,163 A | * 10/1981 | Emi et al. | .................... 428/212 |
| 4,329,309 A | 5/1982 | Kelly | |
| 4,351,872 A | 9/1982 | Brosseau et al. | |
| 4,460,633 A | 7/1984 | Kobayashi et al. | |
| 4,469,739 A | * 9/1984 | Gretzinger et al. | |
| 4,606,964 A | 8/1986 | Wideman | |
| 4,636,419 A | * 1/1987 | Madsen et al. | |
| 4,673,015 A | 6/1987 | Andreasson | |
| 4,692,380 A | * 9/1987 | Reid | |
| 4,728,565 A | 3/1988 | Fontana | |
| 4,775,579 A | 10/1988 | Hagy et al. | |
| 4,980,227 A | 12/1990 | Sekiguchi et al. | |
| 4,999,232 A | 3/1991 | Levan | |
| 5,045,377 A | 9/1991 | Amata | |
| 5,232,777 A | * 8/1993 | Sipinen et al. | |
| 5,334,446 A | * 8/1994 | Quantville et al. | |

FOREIGN PATENT DOCUMENTS

EP          0 046 402 A2      2/1982

* cited by examiner

Primary Examiner—Cheryl A. Juska
Assistant Examiner—Alexis Wachtel
(74) Attorney, Agent, or Firm—Vidas, Arrett & Steinkraus PA

(57) ABSTRACT

The invention is an extruded bicomponent elastomeric netting having unidirectional elasticity. Such a netting product is a non-woven article employing a non-elastic material such as polypropylene (10) in the machine direction strands and an elastic material such as a styrenic block copolymer (12) in the cross machine direction strands. The reverse arrangement, a product with "reverse strand distribution", is also possible.

33 Claims, 2 Drawing Sheets

BICOMPONENT ELASTOMERIC NETTING

BACKGROUND OF THE INVENTION

1. Field of The Invention

This invention relates to plastic netting, and more particularly to an extruded bicomponent elastomeric netting having unidirectional elasticity, that is in either the machine direction or the transverse direction.

2. Description of the Related Art

For purposes of the present invention, the terms "cross machine direction" and "transverse direction" are synonymous and sometimes simply referred to as "TD", as are the terms "longitudinal direction" and "machine direction", sometimes simply referred to as "MD". However, the term "transverse" is sometimes also used to refer to strands which extend in a direction opposite to that of strands previously referred to. The meaning will be clear from the context in any particular instance. Current production elastomeric roll goods, such as scrims, sheets, films, foams, nettings, nonwovens, fibers, threads and the like are basically isotropic, exhibiting essentially the same properties in all directions of their two dimensional plane. However, in many applications, elastomeric properties are desired in only one direction, while elastomeric properties in the other direction are unnecessary or even detrimental to product functionality. Although numerous patents exist describing netting, woven and non-woven fabrics, meshes and chain nets with bicomponent materials or unidirectional elasticity or netlike articles, they do not provide any suggestion to modify the prior art such as is done in the present invention with respect to extruded plastic net. Existing technology does not include an extruded bicomponent elastomeric netting with unidirectional elasticity which may be manufactured more economically than most conventional elastomeric netting on the market.

Nets, wovens and nonwoven reinforcements made of more than one material are disclosed in U.S. Pat. No. 4,636,419 to Madsen, U.S. Pat. No. 4,241,123 to Shih, and U.S. Pat. No. 4,460,633 to Kobayashi et al. In addition, a netting die fed by two separate polymer streams is disclosed in U.S. Pat. No. 3,791,784 to Arechavaleta.

U.S. Pat. No. 4,636,419 issued to Madsen et al on Jan. 13, 1987 discloses a "Net and Method of Producing Same" which employs a combination of side by side extrusion streams, transversal embossment, and splitting to produce netting composed of a regular array of longitudinal ribbon-formed continuous polymer filaments and a regular array of transverse stems or strands of a different polymer matter. It is disclosed that the use of two different polymer substances in two directions affords netting of interesting and unusual properties (col. 2, Ins 12–25 and 30–31). In Example One, the cross machine component comprises Nylon 6 and the machine direction component comprises polypropylene (col. 11, Ins. 13–31). It is disclosed that elastomeric netting may be prepared by the method of this patent, and preferred materials as well as a suitable application for such netting is disclosed (col. 9, In. 67 through col. 10, In. 7). Unidirectional elasticity in net as-extruded is neither disclosed nor suggested.

U.S. Pat. No. 4,241,123 issued to Shih on Dec. 23, 1980 discloses non-woven netting wherein a first group of melting monofilaments are die extruded and a second group of monofilaments or a yarn is crossed, pressed, and welded to form a welded plastic netting (col. 3, Ins. 8–12). Unidirectional elasticity is not disclosed.

U.S. Pat. No. 4,460,633 issued to Kobayashi et al on Jul. 17, 1984 discloses a nonwoven reinforcement for resinous composites made of bundles of non-twist or soft twist yarns as warps on both sides of bundles of non-twist or soft twist yarns as wefts, warps and wefts being bonded by an adhesive agent impregnated into the wefts. This invention differs from the present invention in that it does not suggest unidirectional elasticity, having flexure no different from that of a woven fabric.

U.S. Pat. No. 4,980,227 issued to Sekiguchi et al on Dec. 25, 1990 discloses a stiff, netlike sheet of heat bonded five layer and three layer polyolefin yarns which exhibits retention of its sheet-like shape due to its stiffness. Although heat bonding of polyolefin materials is mentioned, neither an extruded net nor the use of another material to produce unidirectional elasticity is disclosed or suggested.

U.S. Pat. No. 3,791,784 to Arechavaleta discloses an extrusion die fed by two separate polymer streams. Although Arechavaleta suggests that two different materials may be extruded, it is not suggested that the die be used to produce a resulting netting structure which will possess good strand to strand bond, uniform transverse direction strand spacing, or a high transverse direction packing density, i.e. transverse direction strandcount, nor is a net having unidirectional elasticity suggested. In particular it is not suggested that netting strands made of two basically incompatible resin groups, such as polyolefins and styrenic block copolymers, can provide a good bond with the associated desirable properties. Differences in polymer compatibility, rheology, processing melt history, melt temperatures and the like contribute to the expectation of a poor strand to strand bond as compared to a situation in which one polymer component is used for the two melt streams.

Fabrics, meshes, chain nets, and support materials with elastic properties are disclosed in U.S. Pat. No. 4,107,371 issued to Dean, U.S. Pat. No. 4,673,015 issued to Andreasson, U.S. Pat. No. 4,728,565 issued to Fontana, U.S. Pat. No. 4,469,739 issued to Gretzinger, and U.S. Pat. No. 4,351,872 issued to Brosseau et al. These products are expensive to produce, and are significantly different from a netting product.

U.S. Pat. No. 4,107,371 issued to Dean on Aug. 15, 1978 discloses a fabric woven of plastic-coated yarn and polymer strands that is relatively stiff in one direction and relatively flexible in the other direction. This differs from the present invention in that it does not disclose, teach or suggest making an extruded net from two different polymers.

U.S. Pat. No. 4,351,872 issued to Brosseau et al on Sep. 28, 1982 discloses a unidirectional stretch mesh laminate used in an orthopaedic traction harness. A commercially available DuPont unidirectional stretch mesh is discussed at col. 3, Ins. 12–18 as a component of the invention. No patent was found disclosing said mesh.

U.S. Pat. No. 4,469,739 issued to Gretzinger on Sep. 4, 1984 discloses an oriented woven furniture support material made in part from an elastomer monofilament and in part from synthetic or natural yarn. Unlike the extruded bicomponent elastomeric netting of the present invention, this material is woven, and is not completely plastic in composition.

U.S. Pat. No. 4,673,015 issued to Andreasson on Jun. 16, 1987 discloses a chain net which may include links of elastically deformable material. is suggested that although warp and weft strands are usually made of links of similarly elastic material, the weft strands may alternatively be made of other material (col. 2, Ins. 49–64). Although unidirectional elasticity is suggested, this patent does not disclose an extruded net.

U.S. Pat. No. 4,728,565 issued to Fontana on Mar. 1, 1988discloses an elastic support member for supporting stuffing of furniture pieces comprising an elastic net or belt formed of a net or honeycomb fabric or a woven fabric comprised of rubber threads arranged in at least one of the transverse and longitudinal directions. This patent is an improvement of Italian Patent No. 955,134. Although the appearance of rubber threads in at least one direction suggests unidirectional elasticity, this patent neither discloses nor suggests an extruded net as in the presently disclosed invention.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

SUMMARY OF THE INVENTION

The present invention is an extruded bicomponent elastomeric netting having unidirectional elasticity. It is economical to produce. The bicomponent netting of the present invention may be produced by an extrusion die fed by two separate polymer streams. Such a netting is a non-woven employing a relatively non-elastic strand material in one direction and a relatively elastic transverse strand material in the opposite direction. Any combination of resins with an elastomeric resin blend may be used, as long as the two types of resin strands are compatible from processing and rheological standpoints. For example the strands of the two resin streams should show good joint bond strength. The net may comprise preferably a non-elastic material such as a polyolefin in the machine direction and an elastic material in the cross machine direction. A product with reverse strand distribution may also be produced, with the elastic material in the machine direction and the non-elastic material in the cross machine direction. It was unexpectedly found that polyolefins and styrenic blok copolymers, two basically incompatible polymers, possess good bond strength. For the purposes of this invention, that combination represents a preferred embodiment of the invention. That preferred embodiment of the invention employs an elastic material of a styrenic block copolymer resin such as is commercially available under the Kraton® brand from Shell Oil Company, Houston, Tex. or the Vector brand which is available from Dexco Polymers, a Dow/Exxon partnership, of Plaquemine, La. The non-elastic strands are preferably in the machine direction in this preferred embodiment and may be oriented. Of course, the opposite arrangement of strands may be used according to this invention.

DESCRIPTION OF THE PREFERRED EMBODIMENTS

Figure 1:
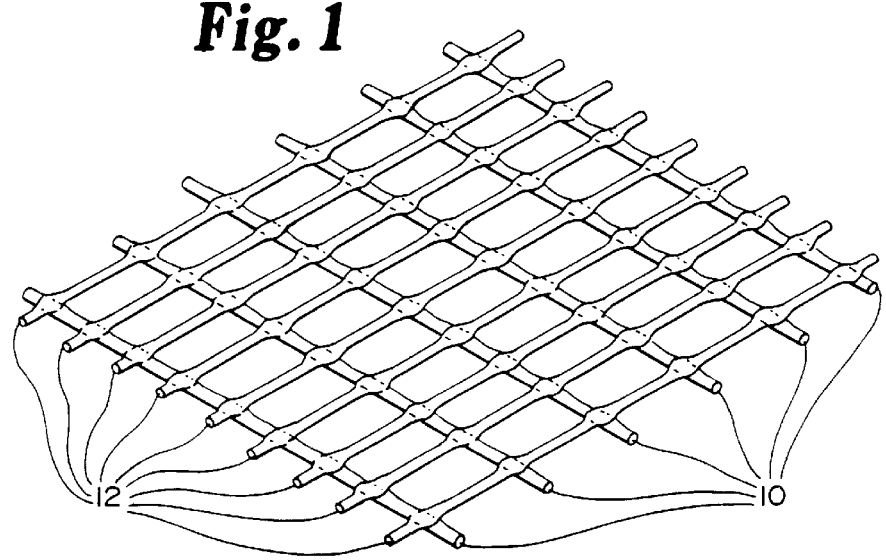
FIG. 1 is a perspective view of the netting of the present invention.
Figure 2:
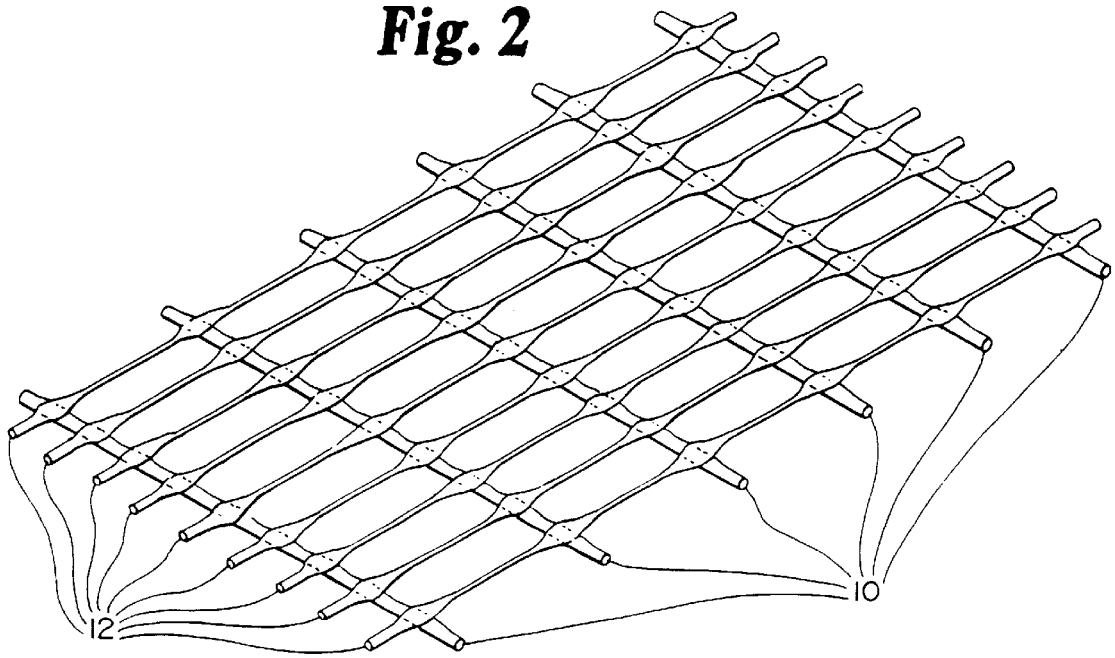
FIG. 2 is a the netting of FIG. 1 shown with the elastic strands stretched.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, The bicomponent elastomeric netting shown is extruded and may consist of strands of a relatively non-elastic material 10 extending in one direction and strands 12 of a relatively elastic material extending in a crosswise or transverse direction. The strands are extruded polymeric elongate members which cross and intersect during extrusion to form the net-like structure. In one preferred embodiment, the non-elastic material is polypropylene and the elastic material is the commercially available Kraton® D grade class resin such as D-1122 or D-2104 from Shell Oil Company, Houston, Tex.

However, in its broad context, the non-elastic strand material may be any extrudable material such as the various nylons, polyesters, polyethylenes including HDPE and copolymers of such resins, the polyolefins being preferred, polypropylene being especially preferred.

For the elastic strand material, in addition to the Kraton D grade class of styrene butadiene styrene (SBS) resins such as those aforementioned, the Vector brand extrusion grade resins such as Vector 6240D (SBS), 6101D styrene isoprene styrene (SIS) and 6201D (SBS) are also preferred. Suitably the elastic strand material is a blend of SBS and SIS resins. Preferred blends are in the range of 50–70 parts SIS to 30–50 parts SBS.

Additional resins such as processing aid resins and slip agents may be added to the elastic strand material in small amounts, such as about 5–30 parts, to improve processability and to enhance physical properties of the elastic strand material. Improvement in processability is for example evidenced by the ability to draw down strands of the mixture. Physical properties enhanced include improved melt strength, and elastic properties such as stress relaxation, set and creep. These processing aid resins include isotatic polypropylene, polyethylene, amorphous polypropylene, polybutylene, ethylene/vinyl acetate copolymer, ethylene/ethyl acrylate copolymer, ethylene/methyl acrylate copolymer, ethylene/methyl acetate copolymer, polystyrene and the like. Preferred resins are polystyrene, polyethylene, polybutylene, polypropylene, ethlene vinyl acetate (EVA) and ethylene methyl acetate (EMA), and the most preferred resin is polystyrene. The relative parts ratios may vary.

Depending on the elastomeric blend used, a slip additive may also be added in an effective amount to prevent blocking, which occurs when the strands of net become tacky and stick to themselves as well as the web handling equipment. Examples of such slip additives are modified fatty acid esters or fatty acid amides.

The most preferred elastic strand material is a blend of SIS/SBS as set forth below:

| 60 parts | SIS |
|---|---|
| 40 parts | SBS |
| 25 parts | Processing Aid Resins |

Figure 3:
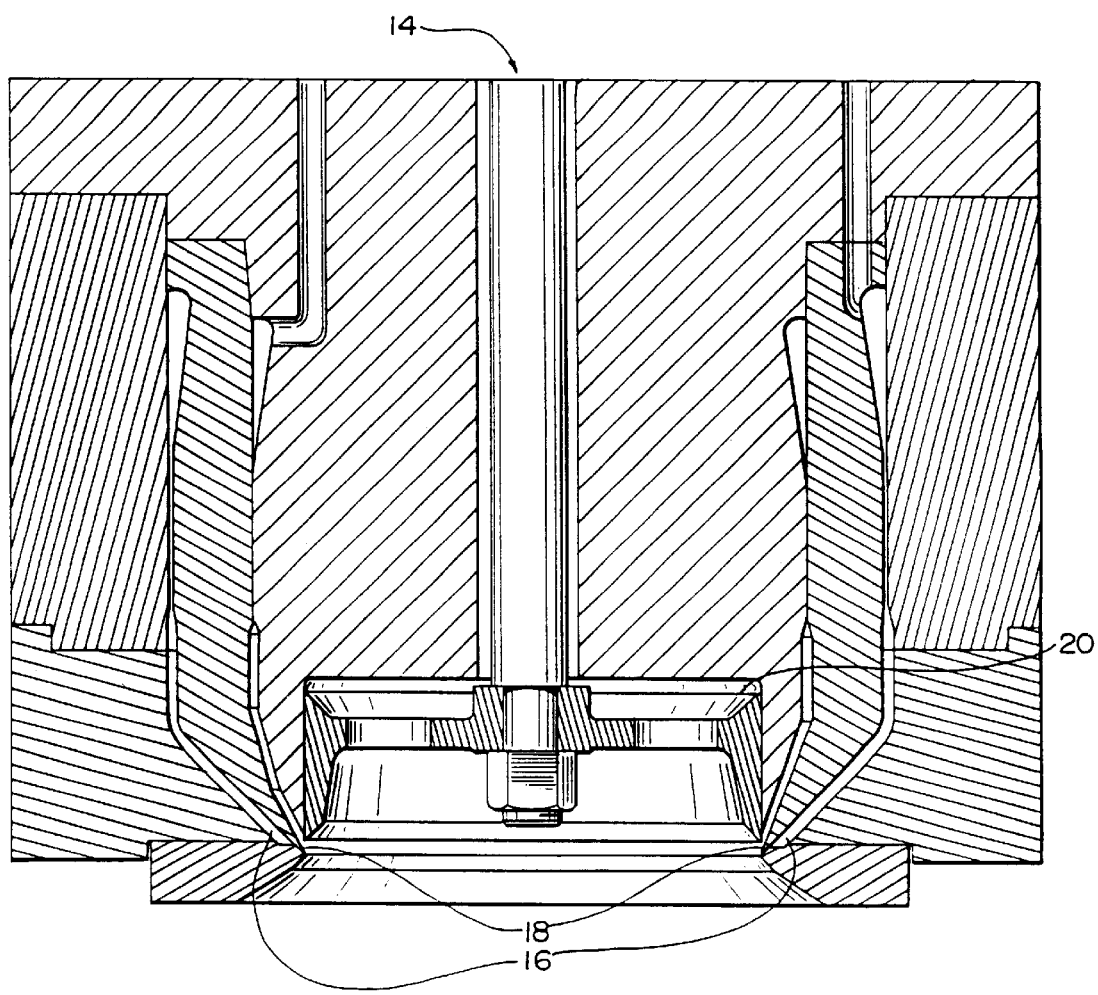
FIG. 3 is a cross sectional view taken through the vertical axis of an extrusion die for making the netting of the present invention.

Referring now to FIG. 3, an extrusion die 14 is shown for forming the bicomponent netting product. The machine direction strands (MD) 10 are the non-elastic strands in this embodiment. In the most preferred embodiment, they are made of polypropylene, which is supplied to the die under pressure and which is discharged continuously from cavity 16 through a plurality of openings (not shown) to form the MD strands. The openings do not appear in the cross section shown in FIG. 3. The transverse direction strands (TD) 12 are formed of a relatively elastic styrenic block copolymer, such as a styrene-butadiene polymer. In the most preferred embodiment, an SIS/SBS blend is used. The elastomer is supplied to the die under pressure and intermittently discharged through slit 18 shown partially open in FIG. 3 which is opened and closed by the reciprocating movement of piston 20. When piston 20 is moved to open slit 18 the elastomer flows out to form transverse TD strands 12 in the form of a closed ring intersecting with all of the MD strands. The netting is extruded in the form of a cylinder or tube, which is then cut lengthwise and flattened to form a continuous sheet. The non-elastic strands (MD in this embodiment) may optionally be oriented in a second processing step.

Since polyolefins and styrenic block copolymers, in combination a preferred embodiment, are two basically incompatible polymer groups, it was unexpected that the bond strength of netting strands made from these two materials would be well bonded at the joints. It is not obvious that netting strands made of two basically incompatible resin groups, such as polyolefins and styrenic block copolymers, can provide a good bond with the associated desirable properties. Differences in polymer compatibility, rheology, processing melt history, melt temperatures and the like contribute to the expectation of a poor strand to strand bond as compared to a situation in which one polymer component is used for the two melt streams.

A high bond strength is particularly required if the extruded bicomponent netting is oriented in a second processing step. In this process step, high forces are transferred and distributed through the netting joint to and from netting strands in all directions. Without a good strand to strand bond at the joint, the product will fail. The resulting product can consequently be made with uniform transverse direction strand spacing, high transverse direction strandcount, and is both uniaxially and biaxially orientable and extensible.

Advantages of the bicomponent elastomeric net of the present invention over all-elastomeric netting are many. For instance, the product may be designed with one set of properties in one direction, and another set of properties in the opposite direction. Specifically, high yield strength and dimensional stability is designed by using a nonelastic polymer such as polypropylene in one direction, while elastomeric properties are ensured by the use of an elastomer such as Kraton® in the opposite direction. The polypropylene/Kraton® combination also improves web handling and processing of an elastomeric product for the netting producer, the converter and the end user. Further, overall product cost may be reduced by using expensive elastomeric resins only where needed and inexpensive resins elsewhere, and by increasing product yield or product area per resin mass through orientation of the nonelastic, polypropylene segments. Similarly, elastomeric product width may be increased through orientation of the non-elastomeric segments.

This completes the description of the preferred and alternate embodiments of the invention. Those skilled in the art may recognize other equivalents to the specific embodiment described herein which equivalents are intended to be encompassed by the claims attached hereto.

What is claimed is:

1. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, wherein the inelastic strands are of a polyolefin resin.

2. The netting of claim 1 wherein the strands of the polyolefin resin extend in the machine direction and the strands of the elastic resin extend in the transverse direction.

3. The netting of claim 1 wherein the polyolefin is polypropylene.

4. The netting of claim 1 wherein the elastic resin further includes a processing aid resin selected from the group consisting of isotatic polypropylene, polyethylene, amorphous polypropylene, polybutylene, ethylene/vinyl acetate copolymer, ethylene/ethyl acrylate copolymer, ethylene/methyl acrylate copolymer, ethylene/methyl acetate copolymer, polystyrene and mixtures thereof.

5. The netting of claim 4 wherein the elastic resin includes about 5–30 parts of the processing aid resin.

6. The netting of claim 5 wherein the parts are about 25.

7. The netting of claim 4 wherein the elastic resin includes about 5–30 parts of polystyrene.

8. The netting of claim 4 wherein the elastic resin includes an amount of a slip agent.

9. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, wherein the elastic strands are of a styrenic block copolymer composition, and wherein the elastic resin is a styrene-isoprene-styrene resin.

10. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, wherein the elastic strands are of a styrenic block copolymer composition, and wherein the copolymer composition is a blend of resins.

11. The netting of claim 10 wherein the elastic resin further includes a processing aid resin selected from the group consisting of isotatic polypropylene, polyethylene, amorphous polypropylene, polybutylene, ethylene/vinyl acetate copolymer, ethylene/ethyl acrylate copolymer, ethylene/methyl acrylate copolymer, ethylene/methyl acetate copolymer, polystyrene and mixtures thereof.

12. The netting of claim 11 wherein the elastic resin includes about 5–30 parts of the processing aid resin.

13. The netting of claim 12 wherein the parts are about 25.

14. The netting of claim 11 wherein the elastic resin includes about 5–30 parts of polystyrene.

15. The netting of claim 11 wherein the elastic resin includes amount of a slip agent.

16. A bicomponent elastomeric extruded netting having unidirectional elasticity, said bicomponent elastomeric extruded netting comprising extruded strands consisting essentially of a relatively of a relatively inelastic resin component and transverse extruded strands consisting essentially of a relatively elastic resin component, wherein the elastic strands are of a styrenic block copolymer composition, and wherein the elastic resin is a blend of SBS and SIS.

17. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, and wherein the inelastic strands are a polyolefin and the elastic strands are of a styrenic block copolymer composition.

18. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, and wherein the strands of the elastic resin extend in the machine direction and the strands of the inelastic resin extend in the transverse direction and wherein the inelastic resin is a polyolefin.

19. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, and wherein the strands of the elastic resin extend in the machine direction and the strands of the inelastic resin extend in the transverse direction and wherein the elastic resin is a styrene-isoprene-styrene resin.

20. A bicomponent elastomeric extruded netting having unidirectional elasticity, said bicomponent elastomeric extruded netting comprising extruded consisting essentially of a relatively inelastic resin component and transverse extruded strands consisting essentially of a relatively elastic resin component, and wherein the strands of the elastic resin extend in the machine direction and the strands of the inelastic resin extend in the transverse direction and wherein the elastic resin is a blend of SBS and SIS.

21. A bicomponent elastomeric extruded netting having unidirectional elasticity, said bicomponent elastomeric extruded netting comprising a first set of extruded strands extending in a first direction and a second set of extruded strands extending in the opposite transverse direction, one of said strand sets comprising a polypropylene resin and the other said strand set comprising a styrenic block copolymer resin composition.

22. The netting of claim 21 wherein the polypropylene resin strands extend in the machine direction (MD).

23. The netting of claim 21 wherein the polypropylene resin strands extend in the transverse direction (TD).

24. The netting of claim 21 wherein the elastic resin blend is comprised of a blend of SIS and SBS.

25. The netting of claim 21 wherein the elastic resin comprises about of 50–70 parts SIS and about 30–50 parts SBS.

26. The netting of claim 24 wherein the elastic resin further includes a processing aid resin selected from the group consisting of isotatic polypropylene, polyethylene, amorphous polypropylene, polybutylene, ethylene/vinyl acetate copolymer, ethylene/ethyl acrylate copolymer, ethylene/methyl acrylate copolymer, ethylene/methyl acetate copolymer, polystyrene and mixtures thereof.

27. The netting of claim 26 wherein the elastic resin includes about 5–30 parts of the processing aid resin.

28. The netting of claim 27 wherein the parts are about 25.

29. The netting of claim 26 wherein the elastic resin includes about 5–30 parts of polystyrene.

30. The netting of claim 26 wherein the elastic resin includes an amount of a slip agent.

31. A bicomponent elastomeric extruded netting having unidirectional elasticity, said bicomponent elastomeric extruded netting comprising extruded sods consisting essentially of a relatively inelastic resin component and transverse extruded strands consisting essentially of a relatively elastic resin component, and wherein the strands of the elastic resin extend in the transverse direction and the strands of the inelastic resin extend in the machine direction and wherein the inelastic resin is a polyolefin.

32. A bicomponent elastomeric extruded netting having unidirectional elasticity, said bicomponent elastomeric extruded netting comprising exturded strands consisting essentially of a relatively inelastic resin component and transverse extruded strands consisting essentially of a relatively elastic resin component, and wherein the strands of the elastic resin extend in the transverse direction and the strands of the inelastic resin extend in the machine direction and wherein the elastic resin is a styrene-isoprene-styrene resin.

33. A bicomponent elastomeric extruded netting having unidirectional elasticity, said bicomponent elastomeric extruded netting comprising extruded strands consisting essentially of a relatively inelastic resin component and transverse extruded strands consisting essentially of a relatively elastic resin component, and wherein the strands of the elastic resin extend in the transverse direction and the strands of the inelastic resin extend in the machine direction and wherein the elastic resin is a blend of SBS and SIS.

\* \* \* \* \*

UNITED STATES PATENT AND TRADEMARK OFFICE
CERTIFICATE OF CORRECTION

PATENT NO. : 6,391,420 B1
DATED : May 21, 2002
INVENTOR(S) : Cederblad et al.

It is certified that error appears in the above-identified patent and that said Letters Patent is hereby corrected as shown below:

Column 3,
Line 40, delete "blok" and insert -- block --

Column 6,
Line 57, delete second occurrence of "of a relatively";

Column 7,
Line 25, insert -- strands -- before the word "consisting";

Column 8,
Line 19, delete "sods" and insert -- strands --;
Line 28, delete "exturded" and insert -- extruded --;

Signed and Sealed this

Fourth Day of March, 2003

JAMES E. ROGAN
*Director of the United States Patent and Trademark Office*